United States Patent [19]

Yabe et al.

[11] Patent Number: 4,898,706

[45] Date of Patent: Feb. 6, 1990

[54] PROCESS FOR PRODUCING MOLDED ARTICLES WITH UNEVEN PATTERN

[75] Inventors: Seizo Yabe, Tokyo; Kunio Yamazaki, Osaka, both of Japan

[73] Assignee: Mitsubishi Gas Chemical Company, Inc., Tokyo, Japan

[21] Appl. No.: 253,638

[22] Filed: Oct. 6, 1988

[30] Foreign Application Priority Data

Oct. 7, 1987 [JP] Japan ................................ 62-251650

[51] Int. Cl.⁴ .............................................. B29C 45/14
[52] U.S. Cl. .................................... 264/266; 264/132; 264/247; 264/259
[58] Field of Search ............... 264/132, 266, 259, 246, 264/247, 511

[56] References Cited

U.S. PATENT DOCUMENTS 3,122,598  2/1964  Berger ................................. 264/132
3,176,057  3/1965  Peters et al. ......................... 264/259
4,016,235  4/1977  Ferro ................................... 264/275

FOREIGN PATENT DOCUMENTS 0105558  9/1978  Japan ................................... 264/132

*Primary Examiner*—James Lowe
*Attorney, Agent, or Firm*—Sughrue, Mion, Zinn, Macpeak & Seas

[57] ABSTRACT

A process for producing a synthetic resin molded article having a pattern formed on its uneven surface, which comprises fitting a patterned film or sheet to a mold and injecting a thermoplastic resin, wherein said mold has engraved therein such an unevenness that said patterned film or sheet undergoes extension of from 5 to 120% upon resin injection, and said patterned film or sheet is a polycarbonate film or sheet having a thickness of from 0.1 to 1 mm. The resulting molded article has a clearly outlined pattern on the uneven surface.

3 Claims, 1 Drawing Sheet

FIG. 1
FIG. 2
FIG. 3
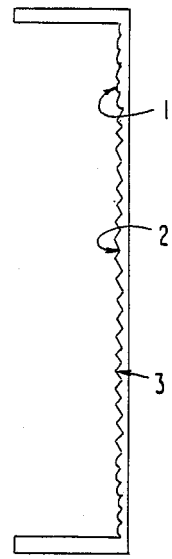
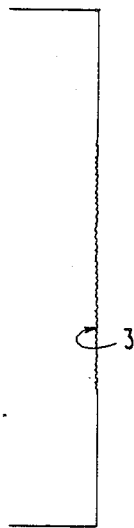
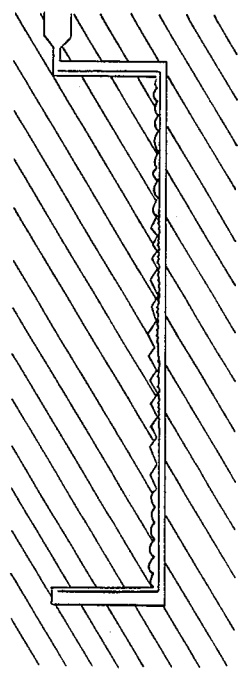

PROCESS FOR PRODUCING MOLDED ARTICLES WITH UNEVEN PATTERN

FIELD OF THE INVENTION

This invention relates to a process for producing synthetic resin molded articles having a pattern on the unevenly cut surface thereof. More particularly, it relates to a process for producing a molded article with an uneven, clearly outlined pattern which comprises fitting a polycarbonate resin film or sheet (hereinafter referred to as sheet) having a pattern, such as letterings and marks, to a mold and injecting a thermoplastic resin to unite the sheet and the injected resin into one body, without requiring preliminary shaping of the sheet.

BACKGROUND OF THE INVENTION

It is conventionally known to produce a molded article with a pattern by fitting a flat patterned sheet made of paper, polyolefin resins, acrylic resins, polyester resins, etc. to a mold and injecting a thermoplastic resin into the mold. These molding techniques are unsuitable for pattern formation along a surface having a sharp unevenness, such as convexities, concavities and V-cuts. In general, molded articles with a pattern on a sharply cut surface have conventionally been produced by preparing a molded article having an uneven surface and then forming a pattern thereon by printing, hot-stamping or the like post-decorating technique. In recent years, a heat transfer method has been developed, which comprises forming a prescribed pattern on a thin polyester resin film, preliminarily shaping the film to a desired unevenness in agreement with the unevenness of a mold, fixing the pre-shaped film to the mold, and injecting a resin to obtain an article to which only the pattern has been transferred.

However, the above-stated post-decorating techniques including printing and hot-stamping find difficulty in forming a clearly outlined pattern on a sharply uneven surface. On the other hand, the heat transfer method essentially requires an extra step of preliminary shaping the film so as to make a satisfactory pattern. Besides, the positions where the pattern can be heat-transferred are limited because the pattern is brought into direct contact with a high temperature injected resin.

SUMMARY OF THE INVENTION

One object of this invention is to provide a process for producing a synthetic resin molded article having a clearly outlined pattern on its uneven surface without involving preliminary shaping of a sheet to be fitted to a mold.

The inventors have conducted extensive studies and, as a result, found that the above object can be accomplished by using a polycarbonate sheet as a patterned sheet.

That is, the present invention relates to a process for producing a synthetic resin molded article having a pattern, such as letterings, marks, etc., formed on its uneven surface, which comprises fitting a patterned film or sheet to a mold and injecting a thermoplastic resin, wherein said mold has engraved therein such an unevenness that said patterned sheet undergoes extension of from 5 to 120% upon injection, and said patterned sheet is a polycarbonate sheet having a thickness of from 0.1 to 1 mm.

In a preferred embodiment of this invention, the sheet has formed a pattern on its side to be in contact with the mold so that the pattern does not directly contact with the injected resin. Alternatively, the sheet has formed a pattern on its surface which is not to be in contact with the mold and has further provided on the pattern thereof a transparent protective coat so that the pattern may not directly contact with the injected resin.

BRIEF DESCRIPTION OF THE ACCOMPANYING DRAWINGS

FIG. 1 is a sectional view of a transparent molded article having a lettering thereon according to the present invention.

FIG. 2 is a sectional view of a polycarbonate sheet having a lettering thereon.

FIG. 3 is a schematic cross section of a mold for producing the molded article of FIG. 1, in which the polycarbonate sheet of FIG. 2 is fitted.

DETAILED DESCRIPTION OF THE INVENTION

The present invention is illustrated by referring to the accompanying drawings.

In FIG. 1, the molded article has an uneven reverse surface. The peripheral portion of the reverse surface has a convex unevenness (indicated by numeral 1), and the central portion thereof has a V-cut unevenness (indicated by numeral 2) on which a pattern of letters (indicated by numeral 3) is formed. The surface opposite to the uneven surface has a mirror-smooth surface formed by a thermoplastic resin.

FIG. 2 shows a bent polycarbonate sheet for producing the molded article of FIG. 1. The sheet has a pattern of letters 3 on its surface to be in contact with a mold.

FIG. 3 schematically shows a mold having an engraved surface for producing the molded article of FIG. 1, in which the polycarbonate sheet of FIG. 2 is fitted to the engraved surface. A thermoplastic resin is injected into the cavity through the gate and made to flow while pushing the sheet toward the mold surface thereby forming the sheet to follow the engraved unevenness and uniting the sheet and the injected resin into one body.

While the invention has been described with reference to the drawings, it is not limited thereto. For example, two or more sheets may be fitted to the mold, or the sheet may be fitted to both sides of the mold, or the sheet may be fitted not only the entire surface but a part of the surface of the mold. The surface of the uneven side of the molded article can be made sufficiently mirror-smooth by mechanically polishing the uneven surface of the cavity.

The polycarbonate sheet to be used in the present invention is conventional and is not particularly limited. From the standpoint that the sheet can be satisfactorily formed to have the desired unevenness by the heat and pressure of the injected resin while being prevented from tearing, the thickness of the sheet ranges from 0.1 to 1 mm, preferably 0.3 to 0.7 mm. From the standpoint of adhesion to the injected resin, an adhesive layer is preferably provided on the side to be contacted with the injected resin. For example, a polycarbonate sheet is used in case of injecting a polycarbonate resin, and a polycarbonate resin having provided thereon an acrylic resin layer is used in case of injecting an acrylic resin (e.g., polymethyl methacrylate), polystyrene, a methyl methacrylatestyrene copolymer, or an acrylonitrilestyrene copolymer. In cases for other general uses where heat resistance is not particularly required, a polycarbonate sheet having provided thereon an EVA resin is used. The polycarbonate sheet may be colored so long as its transparency is not lost.

Methods for forming a pattern on the polycarbonate sheet is not particularly limited and includes conventional silk screen printing, hot-stamping, and the like. Binders of inks or coatings to be used for pattern formation are not also limited as long as they meet the extension of the sheet upon shaping to the desired unevenness. For example, sheets of known thermoplastic resins, such as PVC resins, acrylic resins, polyester resins, can be employed.

The pattern can be formed on the side to be in contact with the mold or the opposite side to be in contact with the injected resin, or between the sheet and the adhesive layer, if provided. In general, the pattern is preferably formed on the side to be in contact with the mold, i.e., the outer surface of the molded article. When the pattern is formed on the inner side, i.e., the side to be in contact with the injected resin, there is a fear that the pattern may be shifted in areas receiving a strong shear due to the resin flow. In this case, it is desirable to form a protective layer on the patterned surface of the polycarbonate sheet. For example, a laminated polycarbonate sheet having a pattern in its intermedium layer is a preferred embodiment. The thickness of the protective layer is 0.03 to 0.2 mm and does not exceed the thickness of the polycarbonate sheet. The total thickness of the polycarbonate sheet and the protective layer is preferably 0.3 to 0.7 mm.

The degree of unevenness of the engraved surface of the mold should fall within such a range that the fitted sheet is not broken by extension upon shaping to the unevenness. In shaping paper or the like material according to the conventional techniques, the permissible degree of extension of the material should be within several percents. If the material undergoes excessive extension, e.g., of about 10% in parts, or if the material is shaped to a sharp edge even within the permissible degree of extension, the material would be broken at these parts. To the contrary, in the present invention, the polycarbonate sheet can be shaped to a markedly increased degree of unevenness, that is, with a degree of extension of about 120%, and is not broken even when shaped to a sharply edged unevenness, such as a concave or convex edge. Accordingly, the present invention makes it possible to form satisfactory patterns, such as letterings and marks, on almost all types of uneven surface under practical use. That is, the present invention is suitably applicable to formation of various patterns within a degree of extension of from about 5 to 120%, such as engraved patterns (e.g., a hemispherical concavity or convexity and a V-shaped cut) and stepwise patterns (e.g., a rectangular gloove).

The thermoplastic resin which can be used for injection molding is not particularly limited so far as providing a transparent molded article which may be colored. Specific examples of usable thermoplastic resins are polycarbonate, polysulfone, non-crystalline polyester, a polycarbonate/non-crystalline polyester composition, a polycarbonate/styrene-maleic acid copolymer composition, a polycarbonate/styrene-maleimide copolymer composition, acrylic resins, e.g., polymethyl methacrylate, polystyrene, a styrene-methyl methacrylate copolymer, a styrene-maleic acid copolymer, a styrene-maleimide copolymer, polyvinyl chloride, poly-4-methylpentene-1, polyphenylene ether/polystyrene composition, etc. Conditions of injection molding are determined depending on the resin used.

The present invention is now illustrated in greater detail with reference to Example but it should be understood that the present invention is not deemed to be limited thereto.

EXAMPLE

A mold whose cross section is shown in Fig. 3 was used. The cavity had a gap of 5 mm, a width of 180 mm, a length of 450 mm, and an upstand height of 30 mm. The cavity wall forming the outer surface of the molded article had a mirror-smooth surface, and the other side wall forming the inner surface of the molded article had been engraved with hemispherical concavities (depth: 2 mm; pitch: 3 mm; degree of extension: about 5%) aligned in squares at the peripheral portion thereof and V-cuts (depth: 3 mm; pitch: 6 mm; degree of extension: about 41%) aligned in squares at the central portion thereof).

A 0.5 mm thick polycarbonate sheet having printed on one side thereof marks and letters by screen printing with a Vinylite ink (produced by Nagase Co., Ltd.), and the printed sheet was cut out and bent into the shape shown in FIG. 2. The sheet was fitted to the mold on the engraved side, and a polycarbonate resin molding material ("Iupiron S 3000" produced by Mitsubishi Gas Chemical Ind., Ltd.) was injection molded at a resin temperature of 300° C., a mold temperature of 80° C., and an injection pressure of 1800 kg/cm$^2$.

On visual observation of the resulting molded article, the sheet was found completely integral with the injected resin, and the marks and letters previously printed on the sheet were clearly outlined without any shift from the prescribed positions.

For comparison, an injection molded article was produced without the in-mold sheet. When the same pattern was printed on the uneven reverse surface of the resulting molded article by padding, the pad hardly reached the deepest bottoms of the V-shaped surface, failing to clearly print the marks and letters.

As is apparent from the foregoing description, the process of the present invention makes it possible to produce molded articles with a pattern excellent in appearance and shaped to a greatly improved outline as compared with the conventional processes. Further, the pattern, such as letterings and marks, can be formed very easily, thus attaining an improved productivity since they are formed on a flat surface in advance.

Furthermore, since the polycarbonate sheet having excellent impact resistance becomes integral with the injected resin part, molded articles having excellent mechanical properties, such as impact resistance, can be obtained even when resins having poor impact resistance, e.g., polystyrene and polymethyl methacrylate, are used for injection molding. Hence, the present invention is of great industrial significance in view of appearance and performance of the products as well as productivity.

While the invention has been described in detail and with reference to specific embodiments thereof, it will be apparent to one skilled in the art that various changes and modifications can be made therein without departing from the spirit and scope thereof.

What is claimed is:

1. A process for producing a synthetic resin molded article having a pattern formed on its uneven surface, which comprises fitting a patterned film or sheet to a mold and injecting a thermoplastic resin, wherein said mold has engraved therein a sharp unevenness such that said patterned film or sheet undergoes extension of from 5 to 120% upon resin injection, said patterned film or sheet is a polycarbonate film or sheet having a thickness of from 0.3 to 1 mm, and said polycarbonate film or sheet has formed a pattern on its side to be in contact with the engraved side of the mold so that the pattern does not directly contact the injected resin.

2. The process as claimed in claim 1, wherein said polycarbonate film or sheet has formed a pattern on its side which is not in contact with the mold and also has provided on the pattern thereof a transparent protective layer so that the pattern may not directly contact with the injected resin.

3. The process as claimed in claim 1, wherein said thermoplastic resin is selected from the group consisting of an acrylic resin, polystyrene, as methyl methacrylate-styrene copolymer, and an acrylonitrile-styrene copolymer, and said polycarbonate film or sheet has provided an acrylic resin layer on its side to be in contact with said injected resin.

* * * * *